US007087349B2

(12) United States Patent
Kim et al.

(10) Patent No.: US 7,087,349 B2
(45) Date of Patent: Aug. 8, 2006

(54) ORGANIC ELECTROLYTIC SOLUTION AND LITHIUM SECONDARY BATTERY EMPLOYING THE SAME

(75) Inventors: Ju-yup Kim, Seoul (KR); Do-young Seung, Seoul (KR); Young-gyoon Ryu, Suwon (KR)

(73) Assignee: Samsung SDI Co., Ltd., Suwon (KR)

( * ) Notice: Subject to any disclaimer, the term of this patent is extended or adjusted under 35 U.S.C. 154(b) by 349 days.

(21) Appl. No.: 10/283,334

(22) Filed: Oct. 30, 2002

(65) Prior Publication Data

US 2003/0124433 A1 Jul. 3, 2003

(30) Foreign Application Priority Data

Oct. 31, 2001 (KR) .............................. 2001-67622

(51) Int. Cl.
*H01M 10/40* (2006.01)

(52) U.S. Cl. ...................... 429/326; 429/330; 429/331; 429/332; 429/333; 429/341

(58) Field of Classification Search ................ 429/324, 429/326, 327, 329, 330, 331, 332, 333, 334, 429/335, 336, 337, 338, 341, 342, 343
See application file for complete search history.

(56) References Cited

U.S. PATENT DOCUMENTS 3,907,597 A * 9/1975 Mellors ...................... 429/327
5,484,670 A 1/1996 Angell et al.
5,506,073 A 4/1996 Angell et al.
6,159,638 A 12/2000 Takatera et al.
6,596,441 B1 * 7/2003 Green et al. ................ 429/326
6,713,215 B1 * 3/2004 Watanabe et al. ....... 429/330 X
6,828,066 B1 * 12/2004 Fujinami et al. ............ 429/329
2002/0045102 A1 * 4/2002 Jung et al. .................. 429/324

FOREIGN PATENT DOCUMENTS

JP 2000-058120 2/2000

OTHER PUBLICATIONS

Besenhard et al., "High Energy Density Lithium Cells", J. Electroanal Chem. 68(1976)1-18, month unknown.
37th Battery Symposium in Japan, 1996, Wang et al. Effect of Additives on Lithium Cycle Performance, month unknown.

(Continued)

*Primary Examiner*—Stephen J. Kalafut
(74) *Attorney, Agent, or Firm*—Lee & Morse, P.C.

(57) ABSTRACT

An organic electrolytic solution and a lithium secondary battery employing the same, wherein the organic electrolytic solution for a lithium secondary battery includes a polymer adsorbent having an ethylene oxide chain capable of being adsorbed into a lithium metal, a material capable of reacting with lithium to form a lithium alloy, a lithium salt, and an organic solvent. The organic electrolytic solution may be applied to all types of batteries including lithium ion batteries, lithium polymer batteries and lithium metal polymer batteries using a lithium metal for a negative electrode material, and the like. In particular, when the organic electrolytic solution is utilized in a lithium metal polymer battery, it serves to stabilize the lithium metal, and to increase the lithium ionic conductivity, thereby improving the cycle characteristics and charging/discharging efficiency of the battery.

20 Claims, 4 Drawing Sheets

Capacity(mA)
100
80
60
40
20
0
—■—1.15M LiPF 6/EC /D MC/EMC/PC(4:3:3:1)+PEG DME+AlI3
Number of cycles

OTHER PUBLICATIONS

Naoi et al. "Modification of the Lithium Metal Surface by Nonionic, etc..", 2000, J. of the Electrochemical Society 147 (3), 813-819, month unknown.

Ishikawa et al., Electrochemical control of a Li metal anode interface:, etc.., 1999, J. of Electroanalytical Chemistry, 473, 279-284, month unknown.

Ishikawa, Masashi, et al., *Entitled. J. Electroanalytical Chemistry 473:279-284 (Sep. 1999) *Electrochemical control of a Li metal anode interface: improvement of Li capability by inorganic..

Naoi, Katsuhiko, et al., Entitled, J. Electrochemical Society, 147(3):813-819 (Mar. 2000) Modification of the Lithium Metal Surface by Nonionic Polyether Sufactants II. Investigations . . .

Mori, Mitsuhiro, et al., *Entitled, J. Electrochem. Soc., 145(7):2340-2348 (Jul. 1998) * Modification of the Lithium Metal Surface by Nonionic Polyether Surfactants: Quartz Crystal . . .

* cited by examiner

ORGANIC ELECTROLYTIC SOLUTION AND LITHIUM SECONDARY BATTERY EMPLOYING THE SAME

BACKGROUND OF THE INVENTION

1. Field of the Invention

The present invention relates to a lithium secondary battery, and more particularly, to an organic electrolytic solution securely adsorbed into the surface of lithium metal to make current distribution uniform and to increase the ionic conductivity of lithium ions during charging and discharging the invention also relates to a lithium secondary battery having improved lifetime characteristics that employs the organic electrolytic solution.

2. Description of the Related Art

Miniaturized, lightweight, thin and high-performance batteries for supplying power to portable electronic devices are in high demand, accompanying the technological development of portable electronic devices that have become miniaturized and lightweight, such as camcorders, portable communication devices or notebook computers. Research into such batteries therefore has been intensively on-going.

Lithium ion secondary batteries that are being widely used use carbon as negative electrode active materials and transition metal oxides (typically $LiCoO_2$) as positive electrode active materials. In particular, carbon that is used as a negative electrode active material has a theoretical capacity of only 372 mAh/g, which is very low compared to a lithium metal having a capacity of 3860 mAh/g.

Unlike the lithium ion battery that uses a carbon material as the negative electrode material, a lithium metal battery uses a lithium metal instead of the carbon material as the negative electrode material. The use of a lithium metal as the negative electrode active material considerably reduces the volume and mass of the battery, which is the most significant advantage of lithium metal batteries. Research into secondary batteries therefore has pursued lithium metal batteries. However, such lithium metal batteries encounter several problems including rapid decrease in capacity due to repeated charge/discharge cycles, a change in volume during charging/discharging, instability, and the like. These problems all are caused by growth of lithium dendrites. Such problems associated with secondary batteries using a lithium metal as a negative electrode material make it impossible for the lithium metal batteries to be widely used, even if they have several advantages including the smallest density of 0.53 g/cm$^2$, the highest potential difference of −3.045 V vs a standard hydrogen electrode (SHE), and the highest capacity per weight of 3860 mAh/g.

Various studies for preventing growth of lithium dendrites during charging are being actively carried out. There are two ways of stabilizing lithium: one is a physical method of suppressing growth of lithium dendrites by formation of a protective layer; and the other is a chemical method. Besenhard et al. (*J. of Electroanal. Chem.* 1976, 68, 1) discovered that the type of a lithium precipitate was greatly dependent upon the chemical composition and physical structure of a surface film. In other words, the physical formation of lithium dendrites results from a chemically uneven state of a surface film.

Yoshio et al. made approaches to increase the reversibility of a lithium negative electrode by controlling the surface state of a lithium metal such that an additive was added to a liquid electrolyte or lithium metal itself, as disclosed by in the 37$^{th}$ Battery Symposium in Japan, 1996. For example, an additive such as carbon dioxide, 2-methyl furan, magnesium iodide, benzene, pyridine, hydrofuran or a surfactant may be added to intentionally form a dense, thin and uniform surface film, thereby improving the surface state. These approaches have been attempted for the purpose of preventing formation of lithium dendrites by inducing uniform current distribution by forming a uniform, highly-conductive protective layer on the surface of a lithium metal.

Naoi et al. reported in *J. of Electrochem. Soc.,* 147, 813 (2000)) that using the principle that the core of a helical ethylene oxide chain in polyethylene glycol dimethyl ether functions as a path of lithium ions during charging and discharging, a uniform protective layer could be formed for charging and discharging cycles by adsorbing polyethylene glycol dimethyl ether onto the surface of a lithium metal. Ishikawa et al., disclosed in *J. of Electrochem. Soc.,* 473, 279 (2000) that charging/discharging efficiency could be increased by suppressing growth of lithium dendrites by formation of lithium alloys by adding aluminum iodide ($AlI_3$) or magnesium iodide ($MgI_2$) to an organic electrolyte.

However, these attempts still have a limitation in keeping a surface film at a uniform state over a repetition of charging and discharging cycles and passage of an immersion time. Also, in the case where each of the above-described attempts is made independently, a satisfactory cycle efficiency cannot be expected.

The description herein of various disadvantages and deleterious properties realized by certain known products, processes, and/or apparatus is by no means intended to limit the invention. Indeed, various aspects of the invention may include some of the known products, processes, and/or apparatus without suffering from the described disadvantages and deleterious properties.

SUMMARY OF THE INVENTION

To solve these and other problems, it is a first feature of the present invention to provide an organic electrolytic solution that can maintain a high efficiency of lithium charging/discharging even by repeated charging and discharging cycles, by forming a uniform, secured protective coating. It is another feature to provide a lithium secondary battery having improved charging/discharging efficiency by employing the organic electrolytic solution.

To achieve these and other features of various embodiments of the invention, there is provided an organic electrolytic solution including a polymer adsorbent having an ethylene oxide chain capable of being adsorbed into a lithium metal, a material capable of reacting with lithium to form a lithium alloy, a lithium salt, and an organic solvent.

In accordance with an additional feature of the invention, there is provided a lithium secondary battery employing the organic electrolytic solution according to the present invention. In accordance with another feature of an embodiment of the invention, there is provided a method of making an organic electrolytic solution that includes mixing a lithium salt and organic solvent to form a mixture, and then adding to the mixture a polymer adsorbent having an ethylene oxide chain capable of being adsorbed into a lithium metal and a material capable of reacting with lithium to form a lithium alloy.

BRIEF DESCRIPTION OF THE DRAWINGS

The above features and advantages of the present invention will become more apparent by describing in detail a preferred embodiment thereof with reference to the attached drawing in which.

DESCRIPTION OF THE PREFERRED EMBODIMENT

Figure 1:
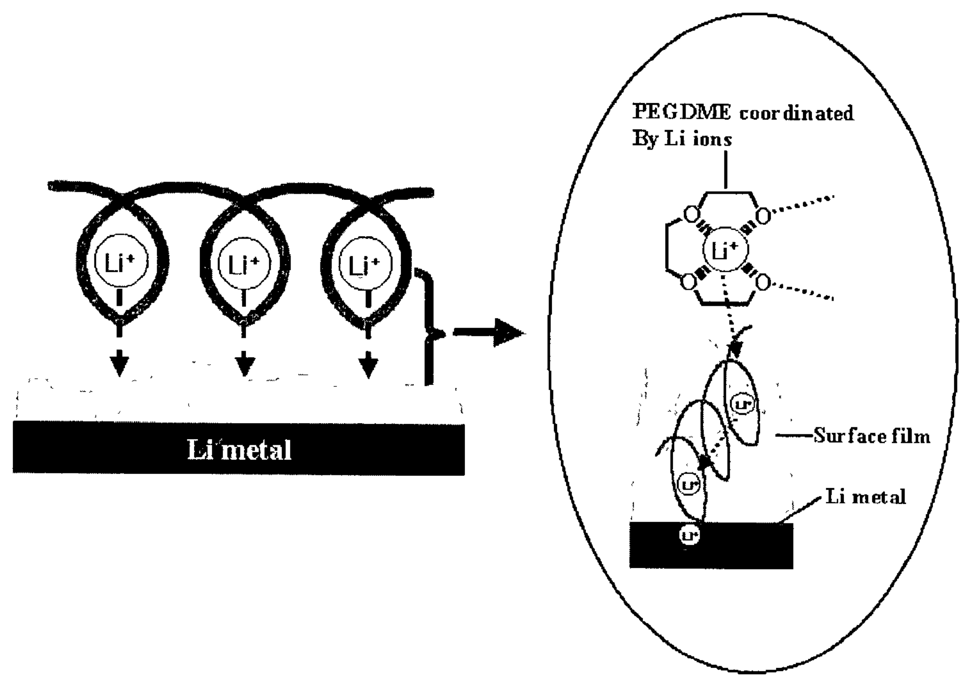
FIG. 1 is a diagram showing the reaction mechanism at an interface between an electrolytic solution having poly(ethyleneglycol) dimethyl ether (PEGDME) and a negative electrode according to the present invention.
Figure 2:
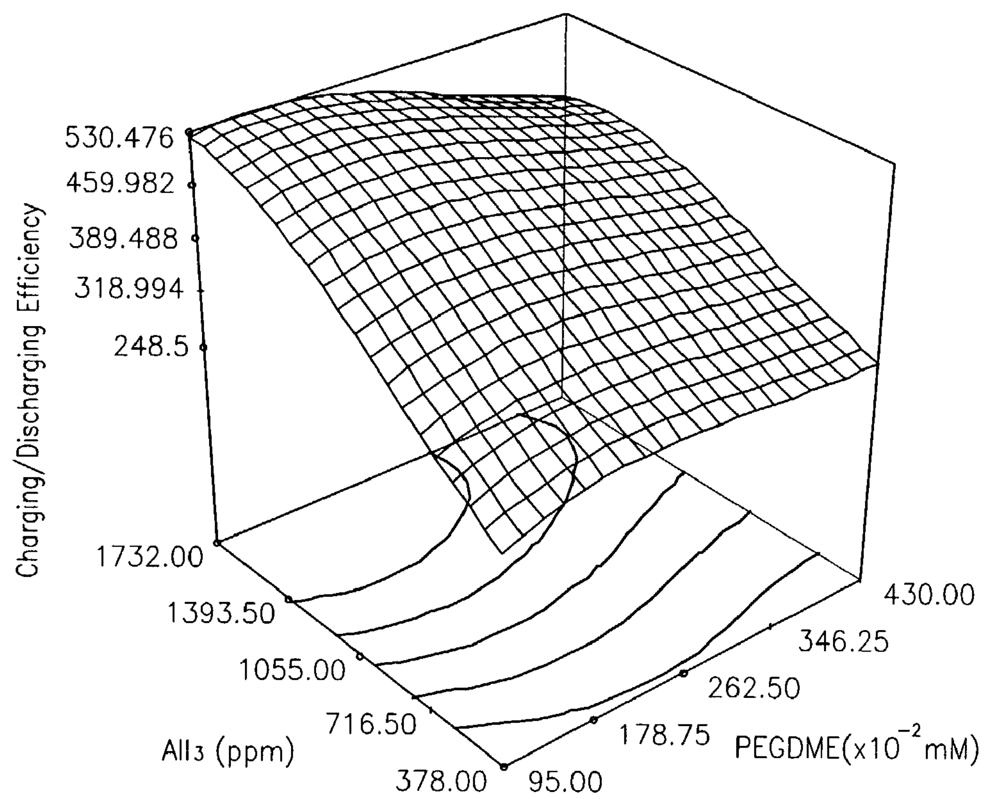
FIG. 2 shows lithium charging/discharging efficiency depending on compositions of PEGDME and aluminum iodide ($AlI_3$) used in the present invention.

The priority document, Korean patent application No. 2001-67622, filed Oct. 31, 2001, and entitled "Organic Electrolytic Solution and Lithium Secondary Battery Employing the Same," is incorporated by reference herein in its entirety.

The present invention will now be described in more detail. As described above, the present invention relates to an organic electrolytic solution, a method of making the organic electrolytic solution, and to a lithium secondary batter including the electrolytic solution. The organic electrolytic solution includes a polymer adsorbent having an ethylene oxide chain capable of being adsorbed into a lithium metal, a material capable of reacting with lithium to form a lithium alloy, a lithium salt, and an organic solvent.

The polymer adsorbent preferably is one or more selected from poly(ethylene)oxide, poly(ethylene glycol) monomethyl ether, poly(ethylene glycol) dimethyl ether, poly(ethylene glycol) monomethyl acrylate, poly(ethylene glycol) dimethyl acrylate, and mixtures thereof.

The amount of the polymer adsorbent added preferably is within the range of from about 0.1 to about 1 part by weight, corresponding to about 0.5 to about 5 mM, based on 100 parts by weight of total organic electrolytic solution used. If the amount of the polymer adsorbent added is less than about 0.1 part by weight, the adsorbent property with respect to lithium metal may be decreased, making uniform adsorption difficult. If the amount of the polymer adsorbent added is greater than about 1 part by weight, the viscosity of the electrolytic solution may overly increase, making the polymer adsorbent function as a resisting material and thus resulting in a decrease in lithium ion conductivity.

In addition, if poly(ethylene glycol) dimethyl ether is used, the amount of the polyethylene glycol dimethyl ether preferably is within the range of from about 0.2 to about 1 part by weight, corresponding to about 1.00 to about 5.00 mM, based on 100 parts by weight of total organic electrolytic solution used.

In another embodiment of the present invention, the weight-average molecular weight of the polymer adsorbent determined by GPC is within the range of from about 200 to 2000. If the weight-average molecular weight of the polymer adsorbent is less than 200, the shortage may give rise to a decrease in adsorbent property with respect to lithium metal. If the weight-average molecular weight of the polymer adsorbent is greater than 2000, the excess entails the disadvantage that the conductivity of the lithium ion may be decreased.

In addition, the weight-average molecular weight of the poly(ethylene glycol) dimethyl ether determined by GPC, if used, preferably is within the range of from about 1000 to about 2000.

In the organic electrolytic solution, the material capable of reacting with lithium to form a lithium alloy preferably is one or more materials selected from aluminum iodide, aluminum phosphate, aluminum sulfate, aluminum triflate, magnesium iodide, magnesium chloride, magnesium bromide, magnesium perchlorate, magnesium hexaflurophosphate, magnesium triflate, and mixtures thereof.

Also, the amount of the material capable of reacting with lithium to form a lithium alloy preferably is within the range of from about 0.01 to about 0.3 parts by weight, based on 100 parts by weight of total organic electrolytic solution. This amount corresponds to about 100 to about 3000 ppm of the material capable of reacting with lithium to form a lithium alloy. If the amount of the material capable of reacting with lithium to form a lithium alloy is less than about 0.01 parts by weight, the shortage entails the disadvantage that a lithium alloy may not be formed well. If the amount of the material capable of reacting with lithium to form a lithium alloy is greater than 0.3 parts by weight, the excess may give rise to a decrease in reactivity due to the formation of an overly thick alloy.

The amount of the aluminum iodide preferably is within the range of from about 0.05 to about 0.3 parts by weight, corresponding to about 500 to about 3000 ppm, based on 100 parts by weight of total organic electrolytic solution.

Preferably, the amount of the polyethylene glycol dimethyl ether added, if use, is about 0.29 parts by weight (1.45 mM) and the amount of the aluminum iodide added, if used, is about 0.17 parts by weight) (1718 ppm), based on 100 parts by weight of total organic electrolytic solution used.

The lithium salt preferably is at least one compound selected from $LiPF_6$, $LiBF_4$, $LiClO_4$, $Li(CF_3SO_2)_2$, $LiN(CF_3SO_2)_2$, $LiSbF_6$, $LiAsF_6$, and mixtures thereof. The concentration of the lithium salt is preferably in the range of 0.4 to 1.5 M.

Also, the organic solvent preferably is at least one solvent selected from ethylene carbonate, propylene carbonate, dimethyl carbonate, diethyl carbonate, methyl ethyl carbonate, vinylene carbonate acetone, acetonitrile, N-methyl-2-pyrrolidone (NMP), diglyme(diethylene glycol dimethyl ether: DGM), diethylene glycol diethyl ether, triglyme(triethylene glycol dimethyl ether: TGM), triethylene glycol diethyl ether, 1,3-dioxolanes (DOX), 4,5-dimethyldioxolane, 4,5-diethyldioxolane, 4-methyl-1,3-dioxolane, 4-ethyl-1,3-dioxolane, 2-fluorobenzene, 3-fluorobenzene, 4-fluorobenzene, dimethoxyethane (DME), diethoxyethane, sulfolane (SUL), and mixtures thereof.

A polymer adsorbent having an ethylene oxide chain used in the present invention preferably is employed to maintain uniformity of the surface of a lithium metal during charging and discharging cycles. As described above, poly(ethyleneglycol) dimethyl ether (PEGDME) is most preferred, because a highly conductive coating can be formed even if a terminal component in the ethylene oxide chain reacts with a lithium metal. In consideration of adsorption and fluidity, the amount of PEGDME added preferably is within the range of from about 0.2 to about 1 part by weight based on the total weight of an electrolytic solution.

As described above, according to the present invention, aluminum iodide ($AlI_3$) is most preferably used as the material capable of reacting with lithium to form lithium alloys because it is easily dissociated into the electrolytic solution and anions desirably act on a solid electrolyte coating. The amount of $AlI_3$ added preferably is within the range of from about 0.05 to about 0.3 parts by weight based on the total weight of an electrolytic solution.

The electrolytic solution of the present invention also includes a lithium salt and an organic solvent. Any lithium salt may be used in the invention. Preferably, lithium salts having good ionic conductivity due to a low lattice energy, that is, a high degree of dissociation, and exhibiting high thermal stability and oxidation resistance are used in the present invention. The lithium salts can be used alone or in selective mixture forms, and the concentration thereof preferably is within the range of from about 0.4 to about 1.5 M. The ionic conductivity of a lithium salt in an organic electrolytic solution is believed to be the highest within this concentration range.

Any organic solvent can be used in the invention. Preferably, the organic solvent used in the present invention has a high dielectric constant (polarity) and a low viscosity and preferably is less reactive with respect to a lithium metal for the purpose of promoting ionic conductance by increasing ionic dissociation. In general, a two- or more-component organic solvent including a high dielectric constant, high viscosity solvent and a low dielectric constant, low viscosity solvent, preferably is used.

In general, the charge/discharge behavior of a lithium secondary battery are greatly influenced by the properties of a coating formed on the surface. Studies for development of various additives as well as lithium salts and solvents, for enhancing charging/discharging efficiency of lithium, have been extensively carried out. In spite of such efforts, formation of lithium dendrites that is associated with a lithium metal still is the most serious problem to be solved. Also, an attempt for stabilizing a lithium metal used as a negative electrode material by employing an additive still poses several problems including occurrence of short-circuit and deterioration of cycle lifetime characteristics.

Compositions of additives added to an organic electrolytic solution according to the present invention have better lithium charging/discharging efficiency than conventional compositions, and can be advantageously adopted to lithium ion batteries, lithium polymer batteries and batteries employing sulfur as a positive electrode material, as well as to lithium metal batteries. A lithium secondary battery using the above-described organic electrolytic solution, particularly, a lithium ion battery or a lithium polymer battery, according to the present invention now will be described. The following description represents preferred methods of making the cathode, anode and other battery components. The invention is not intended to be limited to these preferred embodiments.

First, a cathode active material, a conductive agent, a binder and a solvent preferably are mixed to prepare a cathode active material composition. An aluminum current collector is directly coated with the cathode active material composition and dried to prepare a cathode plate. Alternatively, a cathode plate may be prepared such that the cathode active material composition is cast on a separate support body and a film is peeled off from the support body to then be laminated on an aluminum current collector.

The cathode active material preferably is a lithium-containing metal oxide. Suitable lithium-containing metal oxides include $LiNi_{1-x}Co_xM_yO_2$ wherein x=0 to 0.2, M=Mg, Ca, Sr, Ba or La, and y=0.001 to 0.02, $LiCoO_2$, $LiMn_xO_{2x}$, or $LiNi_{1-x}Mn_xO_{2x}$ wherein x=1 or 2. Also, carbon black preferably is used as the conductive agent. Vinylidene fluoride-hexafluoropropylene copolymer, polyvinylidene fluoride, polyacrylonitrile, polymethyl methacrylate, polytetrafluoroethylene, and mixtures thereof, preferably are used as the binder. Here, the contents of the cathode active material, the conductive agent, the binder and the solvent are in the ranges generally applied for the lithium secondary batteries. Those skilled in the art are capable of fabricating the conductive agent, binder, and solvent, using the guidelines provided herein.

Similarly, an anode active material, a conductive agent, a binder and a solvent preferably are mixed to prepare an anode active material composition. Then, the anode active material composition was directly coated on a copper current collector or cast on a separate support body. An anode active material film obtained by being peeled off from the support body was laminated on a copper current collector to prepare an anode plate.

Metallic lithium, lithium alloys or carbon materials may be used as the anode active material. Specifically usable anode active materials include a carbon material obtained by carbonizing mesophase spherical particles, or graphite fiber obtained by carbonizing and graphiting mesophase pitch fiber. Also, the same conductive agent, binder and solvent as those used for the cathode active material composition are used. In some cases, a plasticizer may be further added to the cathode active material composition or the anode active material composition to form pores in the electrode plates.

As the separator, any one that is used conventionally in lithium secondary batteries can be used. In other words, in the case of fabricating a lithium ion battery, a separator made of a windable material such as polyethylene or polypropylene can be used. In the case of fabricating a lithium ion polymer battery, a separator having excellent capability of impregnating an organic electrolytic solution may be used. Such separators can be prepared in the following manner.

A polymer resin, a filler, a plasticizer and a solvent are mixed to prepare a separator composition. The separator composition is directly coated and dried to form a separator film. Alternatively, the separator composition is cast on a separate support body and dried, and then a separator film obtained by being peeled off from the support body is laminated on the electrode, thereby obtaining the separator.

The polymer resin is not specifically restricted but any material that is conventionally used as the binder of an electrode plate can be used. Suitable polymer resins include vinylidene fluoride-hexafluoropropylene copolymer, polyvinylidene fluoride, polyacrylonitrile, polymethyl methacrylate, polytetrafluoroethylene, and mixtures thereof. Specifically, vinylidene fluoride-hexafluoropropylene copolymer containing 8 to 25% by weight of hexafluoropropylene preferably is used.

Then, a separator is disposed between the cathode plate and the anode plate to form an electrode assembly. The electrode assembly is wound or folded to then be placed into a cylindrical battery case or rectangular battery case, and then the organic electrolytic solution according to the present invention is injected into the resultant structure, thereby completing a lithium ion battery. Alternatively, the electrode assemblies are stacked in a bi-cell structure and then impregnated into an organic electrolytic solution. Then, the resultant structure is put into a pouch and hermetically sealed, thereby completing a lithium ion polymer battery.

FIG. 1 is a diagram showing the basic reaction mechanism of a polymer having an ethylene oxide chain used as an additive of the present invention. Lithium ions are preferentially disposed inside the ethylene oxide chain. Core portions of the helical ion chain act as paths of lithium ions. A polymer additive adsorbed directly in front of the surface of a lithium metal repeatedly performs reversible insertion and extraction of lithium ions during charging and discharging to maintain the surface at a uniform state, thereby stabilizing the lithium metal.

Among materials capable of forming lithium alloys used as the additive in the present invention, metal ions react with lithium ions to form a lithium alloy coating on the surface of a lithium negative electrode, thereby preventing growth of lithium dendrites. Also, among materials capable of forming lithium alloys used as an additive in the present invention, dissociated anions other than the metal ions are impregnated into a solid electrolyte coating to increase the ionic conductivity of lithium ions.

As described above, in a lithium secondary battery employing an electrolytic solution obtained by mixing a polymer having an ethylene oxide chain with a material capable of forming a lithium alloy in an appropriate composition ratio, a uniform, stable protective coating can be formed and lithium charging and discharging efficiency can be improved compared to the prior art.

The present invention will now be described through the following examples and is not limited thereto.

In the experiments conducted, $LiPF_6$ and $LiSO_3CF_3$ were used without refinement as received as battery reagents from Hashimoto, Japan, and the solvent used for preparation of an organic electrolytic solution was available from Merck and Co., New Jersey. The experiments all are were conducted under an argon (over 99.9999%) atmosphere.

EXAMPLE 1

A lithium metal salt, $LiPF_6$, was placed into a plastic box for storing an electrolytic solution at a concentration so as to form a 1.15 M $LiPF_6$ solution, and a mixed solvent of ethylene carbonate (EC)/dimethyl carbonate (DMC)/ethylene methylcarbonate (EMC)/propylene carbonate (PC) was added thereto and violently stirred to dissolve the $LiPF_6$. To the resultant product were added 0.2 parts by weight (1 mM) of polyethylene glycol dimethyl ether (PEGDME) having a weight-average molecular weight of 2000 and 0.05 parts by weight (500 ppm) of aluminum iodide to prepare an organic electrolytic solution.

EXAMPLE 2

An organic electrolytic solution was prepared in the same manner as in Example 1, with the exception that 0.29 parts by weight (1.45 mM) of PEGDME and 0.17 parts by weight of $AlI_3$ were used.

EXAMPLE 3

An organic electrolytic solution was prepared in the same manner as in Example 1, with the exception that 1 part by weight (5 mM) of PEGDME and 0.3 parts by weight of $AlI_3$ were used.

EXAMPLE 4

An organic electrolytic solution was prepared in the same manner as in Example 2, with the exception that 0.2 parts by weight (1 mM) of polyethylene glycol dimethyl acrylate having an average-weight molecular weight of 1000 was used instead of PEGDME.

EXAMPLE 5

An organic electrolytic solution was prepared in the same manner as in Example 2, with the exception that 0.05 parts by weight (500 ppm) of magnesium iodide ($MgI_3$) was used instead of $AlI_3$.

COMPARATIVE EXAMPLE 1

An organic electrolytic solution was prepared in the same manner as in Example 1, with the exception that $AlI_3$ was not added to the mixed organic solvent.

COMPARATIVE EXAMPLE 2

An organic electrolytic solution was prepared in the same manner as in Comparative Example 1, with the exception that PEGDME was not added to the mixed organic solvent.

The charging/discharging efficiency characteristics of the organic electrolytic compositions prepared in accordance with Examples 1 through 5 and Comparative Examples 1 and 2 were evaluated in the following manner.

Using lithium metals for positive and negative electrodes, a separator manufactured by Asahi Chemical Industry Co., Ltd. and the organic electrolytic solutions prepared as above, coin-type cells (2016 (diameter of 20 mm and thickness of 16 mm)) were manufactured, followed by performing charging/discharging tests, and charging/discharging efficiencies thereof are shown in Table 1.

TABLE 1

| | Polymer adsorbent (parts by weight) | Material capable of forming lithium alloy (parts by weight) | Cycle efficiency (%) |
|---|---|---|---|
| Example 1 | PEGDME 0.2 | $AlI_3$ 0.05 | 92.2 |
| Example 2 | PEGDME 0.29 | $AlI_3$ 0.17 | 98.4 |
| Example 3 | PEGDME 1 | $AlI_3$ 0.3 | 91.6 |
| Example 4 | PEGDME 0.2 | $AlI_3$ 0.17 | 97.2 |
| Example 5 | PEGDME 0.29 | $MgI_3$ 0.05 | 94.9 |
| Comparative Example 1 | PEGDME 0.2 | — | 78 |
| Comparative Example 2 | — | $AlI_3$ 0.05 | 83 |

Figure 3:
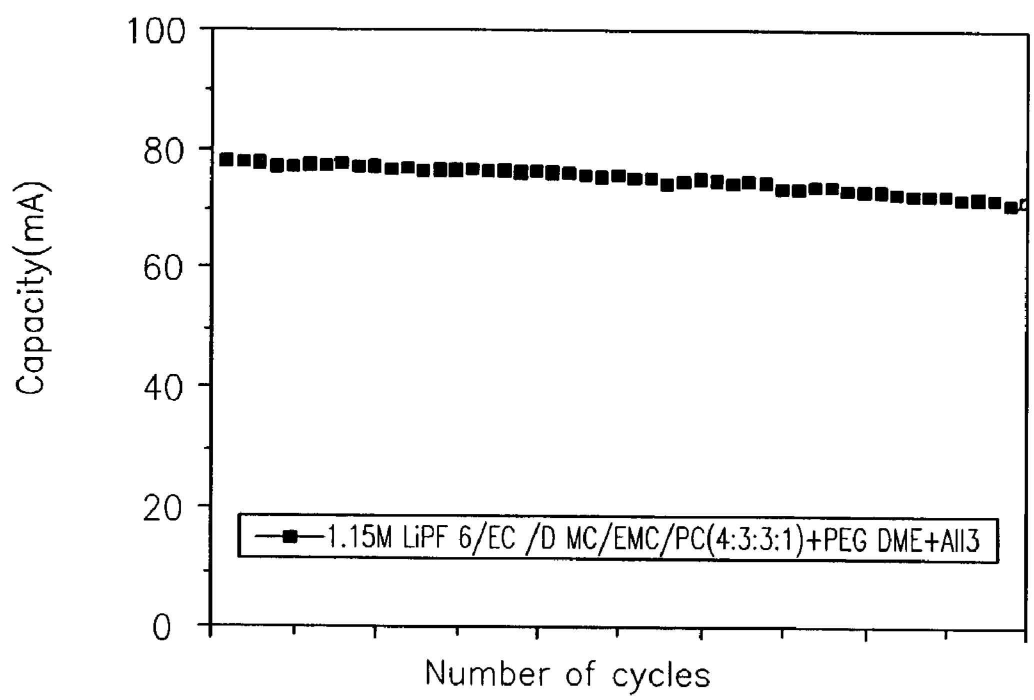
FIG. 3 is a graphical representation of the test results of capacities of a battery employing an electrolytic solution prepared in Example 2.

As shown in Table 1, the batteries employing the organic electrolytic solutions prepared in Examples 1–5 have better charging/discharging cycle efficiency than the batteries employing PEGDME alone (Comparative Example 1) or the battery employing $AlI_3$ alone (Comparative Example 2). Also, it is understood that the battery employing the organic electrolytic solution prepared in Example 2 has the highest charging/discharging cycle efficiency, which is also confirmed from the test results for the particularly preferred composition as shown in FIG. 3. In other words, the preferred composition of the organic electrolytic solution of the present invention comprises about 0.29 parts by weight (145 mM) of PEGDME and about 0.17 parts by weight (1718 ppm) of $AlI_3$. In this case, the capacities of the battery employing the organic electrolytic solution prepared in Example 2 were measured over repeated charging/discharging cycles and the results thereof are shown in FIG. 3.

Figure 4:
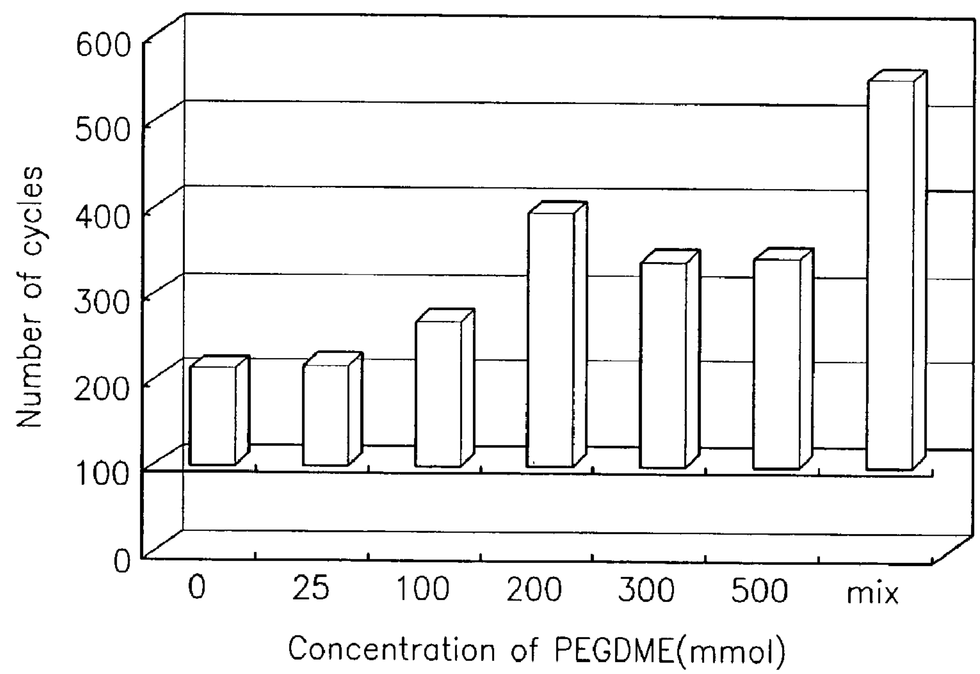
FIG. 4 shows a cycle lifetime characteristic of the battery employing an electrolytic solution according to the prior art depending on the concentration of PEGDME and of an electrolytic solution prepared in Example 2 (mix)

Also, the cycle lifetime characteristics of the battery employing the organic electrolytic solution prepared in Example 2 (mix) was measured while varying the amounts of only PEGDME added, and the results thereof are shown in FIG. 4. It was confirmed that the batteries employing the organic electrolytic solution according to the present invention had good cycle lifetime characteristics.

Figure 5:
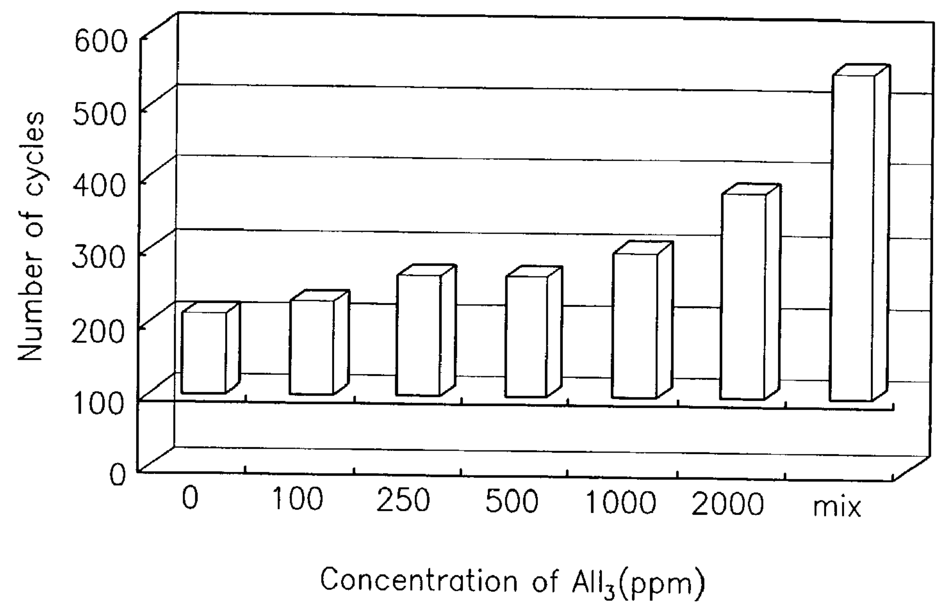
FIG. 5 shows a cycle lifetime characteristic of the battery employing the electrolytic solution according to the prior art depending on the concentration of aluminum iodide ($AlI_3$) and of an electrolytic solution prepared in Example 2 (mix)

FIG. 5 shows the measurement results of cycle lifetime characteristics of a battery employing the organic electrolytic solution prepared in Example 2 (mix) while varying the amounts of only $AlI_3$ added. It was confirmed that the battery employing the organic electrolytic solution according to the present invention had improved cycle lifetime characteristics.

Figure 6:
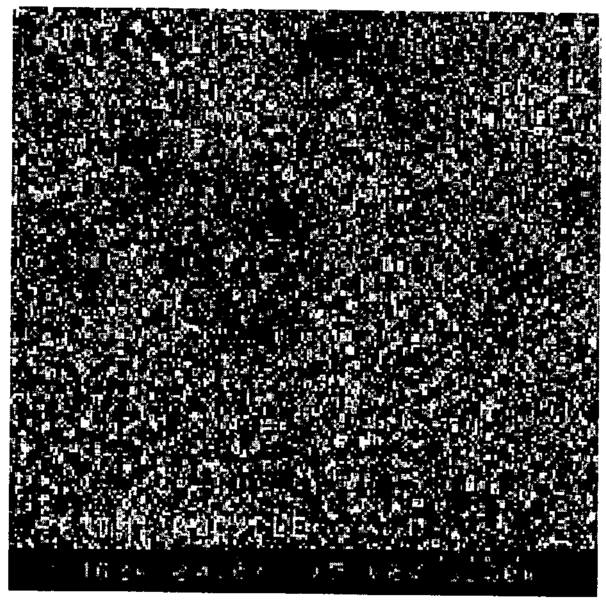
FIG. 6 is a scanning electron microscopy (SEM) photograph illustrating the surface of a negative electrode of a battery employing the electrolytic solution prepared in Example 2 after 100 cycles.
Figure 7:
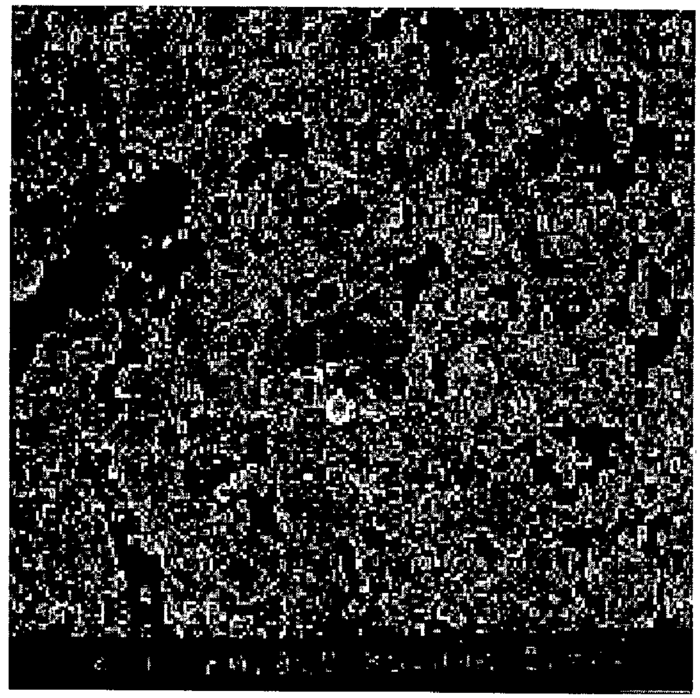
FIG. 7 is an SEM photograph illustrating the surface of a negative electrode of a battery employing an electrolytic solution prepared in Comparative Example 1 after 100 cycles.
Figure 8:
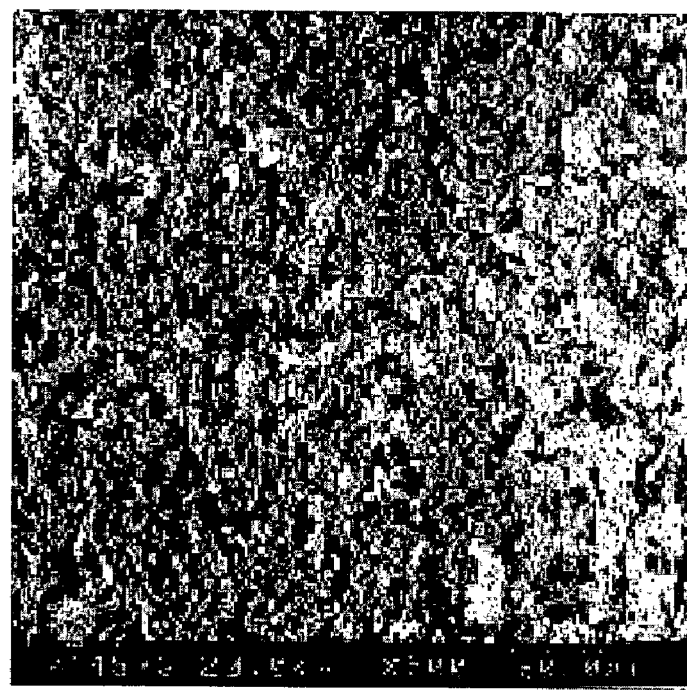
FIG. 8 is an SEM photograph illustrating the surface of a negative electrode of a battery employing an electrolytic solution prepared in Comparative Example 2 after 100 cycles.

FIGS. 6 through 8 are SEM photographs of surfaces of negative electrodes of batteries employing the organic electrolytic solutions prepared in Example 2 and Comparative Examples 1 and 2 after 100 charging/discharging cycles. As shown in the Figures, it was confirmed that the battery employing the organic electrolytic solution prepared in Example 2 had a relatively uniform, stable protective coating, compared to the batteries employing the organic electrolytic solutions prepared in Comparative Examples 1 and 2.

EXAMPLE 6

$LiPF_6$ was dissolved in DOX/TGM (being in a mixture ratio by volume of 1:1) to form a 1 M $LiPF_6$ solution, and 0.29 parts by weight (145 mM) of PEGDME and 0.17 parts by weight (1718 ppm) of $AlI_3$ were added thereto to prepare an organic electrolytic solution.

COMPARATIVE EXAMPLE 3

$LiPF_6$ was dissolved in DOX/DGM/DME/SUL (being in a mixture ratio by volume of 5:2:2:1) to form a 1 M $LiSO_3CF_3$ solution, and 0.29 parts by weight (145 mM) of PEGDME was added thereto as an additive to prepare an organic electrolytic solution.

COMPARATIVE EXAMPLE 4

An organic electrolytic solution was prepared in the same manner as in Comparative Example 3, with the exception that 0.17 parts by weight (1718 ppm) of $AlI_3$ alone was used as an additive.

COMPARATIVE EXAMPLE 5

An organic electrolytic solution was prepared in the same manner as in Comparative Example 3, with the exception that an additive was not used.

Using sulfur for a positive electrode, a lithium metal for a negative electrode, a separator manufactured by Asahi Chemical Industry Co., Ltd. and the organic electrolytic solutions prepared in Example 6 and Comparative Examples 3–5, batteries were manufactured, followed by performing charging/discharging tests, and charging/discharging efficiencies thereof are shown in Table 2.

TABLE 2

| | Polymer adsorbent (parts by weight) | Material capable of forming lithium alloy (parts by weight) | Cycle efficiency (%) |
|---|---|---|---|
| Example 6 | PEGDME 0.29 | $AlI_3$ 0.17 | 86 |
| Comparative Example 3 | PEGDME 0.29 | — | 80 |
| Comparative Example 4 | — | $AlI_3$ 0.17 | 75 |
| Comparative Example 5 | — | — | 61 |

As shown in Table 2, the battery employing the organic electrolytic solution prepared in Example 6 had better cycle efficiency than the batteries employing the organic electrolytic solutions prepared in Comparative Examples 3–5, in which PEGDME was added as an additive, $AlI_3$ was added as an additive and no additive was added, respectively.

In order to evaluate the life characteristics of batteries employing the organic electrolytic solutions prepared in Examples 1–5 and Comparative Examples 1–2, lithium polymer batteries were prepared as follows.

Lithium nickel cobalt oxide, carbon black, a vinylidene-fluoride-hexafluoropropylene copolymer and N-methylpyrrolidone were mixed to prepare a cathode active material composition, and an aluminum foil was coated with the prepared cathode active material composition. Subsequently, the resultant product was dried, rolled and cut to prepare a cathode.

Separately from the above, graphite powder, a vinylidene-fluoride-hexafluoropropylene copolymer and N-methylpyrrolidone were mixed to prepare an anode active material composition, and a copper foil was coated with the prepared anode active material composition. Subsequently, the resultant product was dried, rolled and cut to prepare an anode.

Next, 6 g of a vinylidenefluoride-hexafluoropropylene copolymer available from Elf-Atochem under the trade name of KYNAR™ 2801 was dissolved in 60 ml of acetone and then homogenized with 4 g of silica for 2 hours while stirring, followed by adding 20 ml of n-butanol and stirring for 24 hours, thereby preparing a polymer matrix composition. The polymer matrix composition was cast on a support body and dried at 60° C., thereby preparing a polymer matrix.

Then, the prepared cathode, the polymer matrix and the anode were sequentially laminated to form an electrode assembly. Next, the electrode assembly was dried in a hot-air drying oven at 105° C. and impregnated with an electrolytic solution containing 1.3 M $LiPF_6$ dissolved in a mixed solvent of EC/DMC/DEC, thereby completing a lithium polymer battery.

Discharge capacities of the manufactured lithium polymer battery and discharge capacities thereof after 300 charging and discharging cycles were measured and compared with the initial discharge capacity. The tests for measuring the discharge capacities and life characteristics of the lithium polymer battery were carried out under conditions of 25° C. and 1 C, using a 1C charger/discharger manufactured by Maccor, with a charge voltage of 2.75 to 4.2 V.

The evaluation results of the battery performance of the batteries employing the organic electrolytic solutions prepared in Examples 1–5 and Comparative Examples 1–2 are shown in Table 3.

TABLE 3

| | Average standard discharge capacity (mAh) | Average high-rate (2C) discharge capacity (%) relative to standard discharge capacity | Average 1C discharge capacity (%) relative to standard discharge capacity |
|---|---|---|---|
| Example 1 | 90 | 83 | 91 |
| Example 2 | 90 | 86 | 95 |
| Example 3 | 90 | 82 | 90 |
| Example 4 | 90 | 81 | 88 |
| Example 5 | 90 | 82 | 89 |
| Comparative Example 1 | 90 | 79 | 83 |
| Comparative Example 2 | 90 | 77 | 82 |

As shown in Table 3, the batteries employing the organic electrolytic solutions prepared in Examples 1–5 had better high-rate (2C) discharge efficiency when compared to batteries employing the organic electrolytic solutions prepared in Comparative Examples 1–2.

The organic electrolytic solution for a lithium secondary battery according to the present invention can be applied to all kinds of batteries including lithium ion batteries, lithium polymer batteries and lithium metal polymer batteries using a lithium metal for a negative electrode material, and the like. In particular, when the organic electrolytic solution is employed in a lithium metal polymer battery, it serves to stabilize the lithium metal and to increase lithium ionic conductivity, thereby improving the cycle characteristics and charging/discharging efficiency of the battery.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An organic electrolytic solution comprising a polymer adsorbent having an ethylene oxide chain capable of being adsorbed into a lithium metal, a material capable of reacting with lithium to form a lithium alloy, a lithium salt, and an organic solvent, wherein the polymer adsorbent is poly (ethylene glycol) dimethyl ether, or a mixture containing the same.

2. The organic electrolytic solution according to claim 1, wherein the amount of the polymer adsorbent added is within the range of from about 0.1 to about 1 part by weight, based on 100 parts by weight of total organic electrolytic solution used.

3. The organic electrolytic solution according to claim 1, wherein the weight-average molecular weight of the polymer adsorbent is from about 200 to about 2000.

4. The organic electrolytic solution according to claim 1, wherein the weight-average molecular weight of the poly (ethylene glycol) dimethyl ether is from about 1000 to about 2000.

5. The organic electrolytic solution according to claim 1, wherein poly(ethylene glycol) dimethyl ether is used in an amount of about 0.29 parts by weight, and aluminum iodide is used in an amount of about 0.17 parts by weight, based on 100 parts by weight of total organic electrolytic solution used.

6. The organic electrolytic solution according to claim 1, wherein the organic solvent is at least one solvent selected from the group consisting of ethylene carbonate, propylene carbonate, dimethyl carbonate, diethyl carbonate, methyl ethyl carbonate, vinylene carbonate acetone, acetonitrile, N-methyl-2-pyrrolidone (NMP), diglyme(diethylene glycol dimethyl ether: DGM), diethylene glycol diethyl ether, triglyme(triethylene glycol dimethyl ether: TGM), triethylene glycol diethyl ether, 1,3-dioxolanes (DOX), 4,5-dimethyldioxolane, 4,5-diethyldioxolane, 4-methyl-1,3-dioxolane, 4-ethyl-1,3-dioxolane, 2-fluorobenzene, 3-fluorobenzene, 4-fluorobenzene, dimethoxyethane (DME), diethoxyethane, sulfolane (SUL), and mixtures thereof.

7. A lithium secondary battery comprising the organic electrolytic solution claimed in claim 1.

8. The organic electrolytic solution according to claim 1, wherein poly(ethylene glycol) dimethyl ether is used in an amount within the range of from about 0.2 to about 1 part by weight, based on 100 parts by weight of total organic electrolytic solution used.

9. An organic electrolytic solution comprising a polymer adsorbent having an ethylene oxide chain capable of being adsorbed into a lithium metal, a material capable of reacting with lithium to form a lithium alloy, a lithium salt, and an organic solvent, wherein the material capable of reacting with lithium to form a lithium alloy is one or more materials selected from the group consisting of aluminum iodide, aluminum phosphate, aluminum sulfate, aluminum triflate, magnesium iodide, magnesium chloride, magnesium bromide, magnesium perchlorate, magnesium hexafluorophosphate, magnesium triflate, and mixtures thereof.

10. The organic electrolytic solution according to claim 9, wherein the amount of the material capable of reacting with lithium to form a lithium alloy is within the range of from about 0.01 to about 0.3 parts by weight, based on 100 parts by weight of total organic electrolytic solution.

11. The organic electrolytic solution according to claim 9, wherein aluminum iodide is used in an amount within the range of from about 0.05 to about 0.3 parts by weight, based on 100 parts by weight of total organic electrolytic solution.

12. An organic electrolytic solution comprising a polymer adsorbent having an ethylene oxide chain capable of being adsorbed into a lithium metal, a material capable of reacting with lithium to form a lithium alloy, a lithium salt, and an organic solvent, wherein the lithium salt is at least one compound selected from the group consisting of $LiPF_6$, $LiBF_4$, $LiClO_4$, $Li(CF_3SO_2)_2$, $LiN(CF_3SO_2)_2$, $LiSbF_6$, $LiAsF_6$, and mixtures thereof.

13. The organic electrolytic solution according to claim 12, wherein the concentration of the lithium salt is within the range of from about 0.4 to about 1.5 M.

14. A method of making an organic electrolytic solution comprising a polymer adsorbent having an ethylene oxide chain capable of being adsorbed into a lithium metal, a material capable of reacting with lithium to form a lithium alloy, a lithium salt, and an organic solvent, comprising:

mixing the lithium salt and the solvent to form a mixture; and adding to the mixture the polymer adsorbent having an ethylene oxide chain capable of being adsorbed into a lithium metal and the material capable of reacting with lithium to form a lithium alloy.

15. The method according to claim 14, wherein the polymer adsorbent is one or more polymers selected from the group consisting of poly(ethylene)oxide, poly(ethylene glycol) monomethyl ether, poly(ethylene glycol) dimethyl ether, poly(ethylene glycol) monomethyl acrylate, poly(ethylene glycol) dimethyl acrylate, and mixtures thereof.

16. The method according to claim 14, wherein the material capable of reacting with lithium to form a lithium alloy is one or more materials selected from the group consisting of aluminum iodide, aluminum phosphate, aluminum sulfate, aluminum triflate, magnesium iodide, magnesium chloride, magnesium bromide, magnesium perchlorate, magnesium hexafluorophosphate, magnesium triflate, and mixtures thereof.

17. The method according to claim 14, wherein the lithium salt is at least one compound selected from the group consisting of $LiPF_6$, $LiBF_4$, $LiClO_4$, $Li(CF_3SO_2)_2$, $LiN(CF_3SO_2)_2$, $LiSbF_6$, $LiAsF_6$, and mixtures thereof.

18. The method according to claim 14, wherein the organic solvent is at least one solvent selected from the group consisting of ethylene carbonate, propylene carbonate, dimethyl carbonate, diethyl carbonate, methyl ethyl carbonate, vinylene carbonate acetone, acetonitrile, N-methyl-2-pyrrolidone (NMP), diglyme(diethylene glycol dimethyl ether: DGM), diethylene glycol diethyl ether, triglyme (triethylene glycol dimethyl ether: TGM), triethylene glycol diethyl ether, 1,3-dioxolanes (DOX), 4,5-dimethyldioxolane, 4,5-diethyldioxolane, 4-methyl-1,3-dioxolane, 4-ethyl-1,3-dioxolane, 2-fluorobenzene, 3-fluorobenzene, 4-fluorobenzene, dimethoxyethane (DME), diethoxyethane, sulfolane (SUL), and mixtures thereof.

19. The method according to claim 14, wherein polyethylene glycol dimethyl ether is used in an amount of about 0.29 parts by weight, and aluminum iodide is used in an amount of 0.17 parts by weight, based on 100 parts by weight of total organic electrolytic solution used.

20. A lithium secondary battery comprising an organic electrolytic solution, wherein the organic electrolytic solution includes a polymer adsorbent having an ethylene oxide chain, a lithium salt, and an organic solvent, and the polymer adsorbent is poly(ethylene glycol) dimethyl ether or a mixture containing the same, the battery further including a lithium negative electrode having a lithium alloy on a surface of the electrode.

* * * * *